Feb. 10, 1925.  
C. D. CHAMBERS  
INCUBATOR  
Filed Oct. 29, 1923  
1,525,767  
2 Sheets-Sheet 1
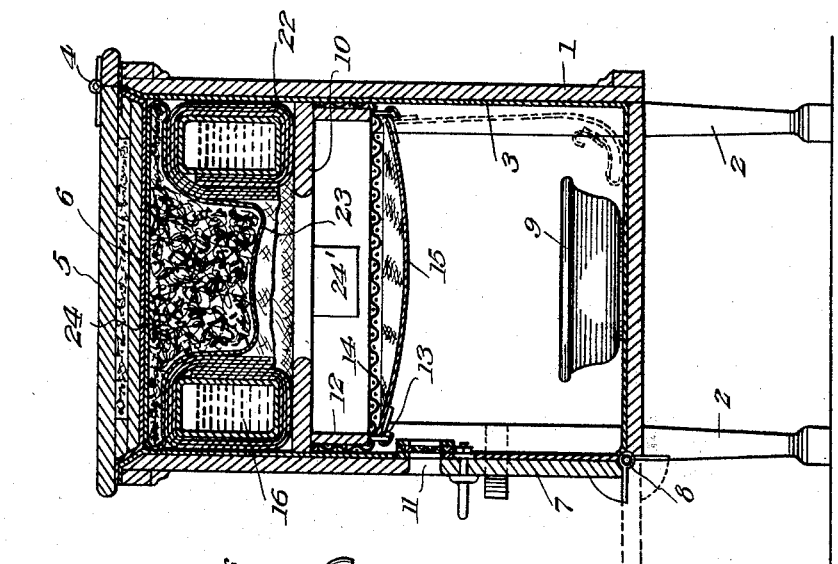
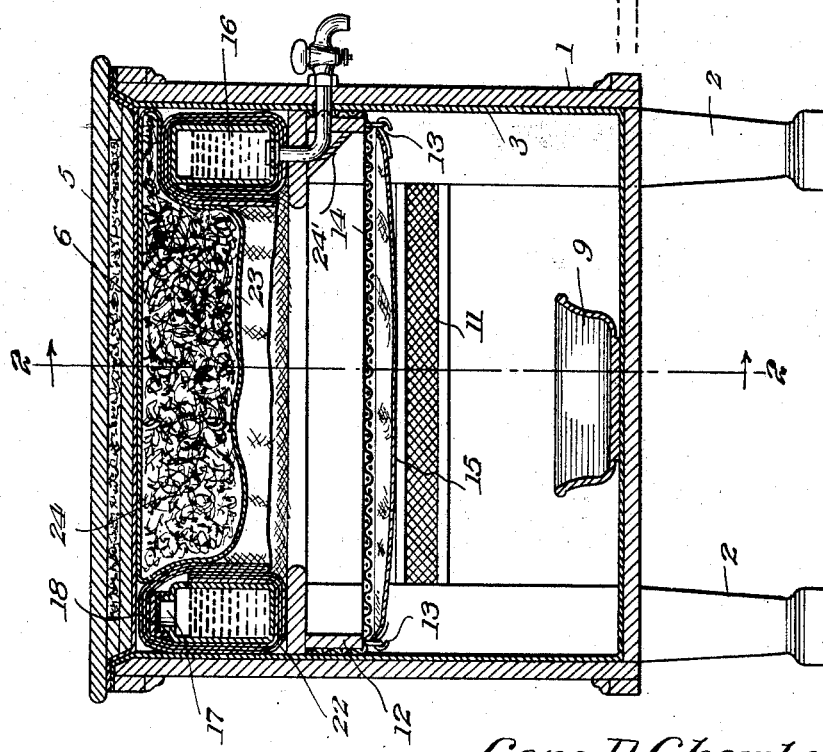
Cora D. Chambers
INVENTOR
BY Victor J. Evans
ATTORNEY
WITNESS:

Feb. 10, 1925.
C. D. CHAMBERS
INCUBATOR
Filed Oct. 29, 1923
1,525,767
2 Sheets-Sheet 2
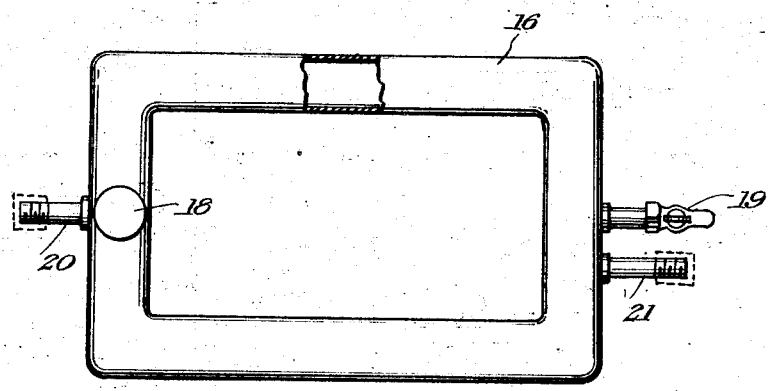
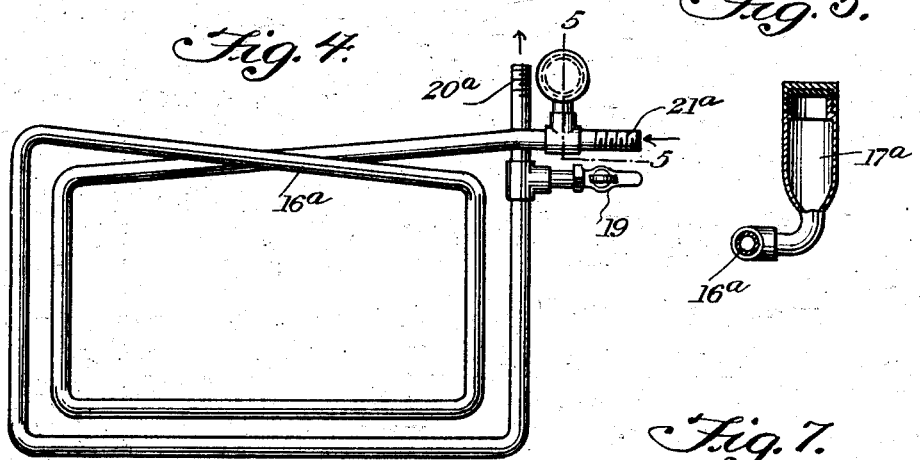
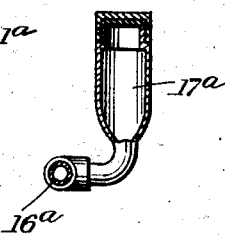
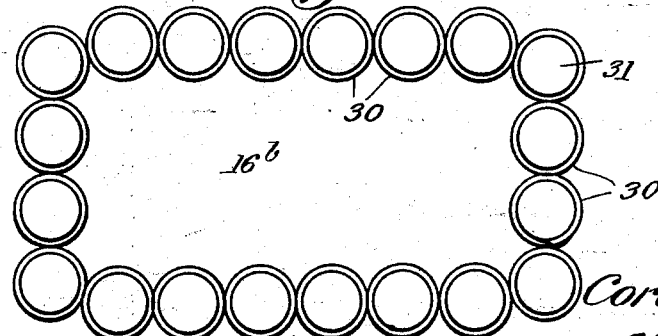
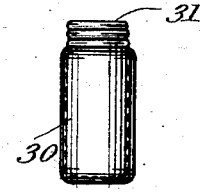
Cora D. Chambers
INVENTOR
BY Victor J. Evans
ATTORNEY Patented Feb. 10, 1925.

1,525,767

UNITED STATES PATENT OFFICE.

CORA D. CHAMBERS, OF ANACOSTIA, DISTRICT OF COLUMBIA.

INCUBATOR.

Application filed October 29, 1923. Serial No. 671,578.

*To all whom it may concern:*

Be it known that I, CORA D. CHAMBERS, a citizen of the United States, residing at Anacostia, in the District of Columbia, have invented new and useful Improvements in Incubators, of which the following is a specification.

My present invention pertains to incubators of the fireless type.

It has for its object the provision of an incubator of said type, characterized by simplicity and inexpensiveness of construction, facility of handling, and dependableness in operation.

To the attainment of the foregoing, the invention consists in the improvement as hereinafter described and definitely claimed.

In the accompanying drawings, forming part of this specification:—

Figure 1 is a longitudinal vertical section showing the preferred embodiment of my invention.

Figure 2 is a cross-section taken in the plane indicated by the line 2—2 of Figure 1.

Figure 3 is a plan view, partly in section, showing the rectangular hot water holder of the device.

Figure 4 is a plan view of a modified hot water holder.

Figure 5 is an enlarged vertical section taken in the plane indicated by the line 5—5 of Figure 4, and showing a detail of the modified hot water holder.

Figure 6 is a plan view showing a hot water holder made up of a plurality of separable units.

Figure 7 is a side elevation of one of said units.

Similar numerals designate corresponding parts in Figures 1 to 3 to which reference will first be made.

Among other elements my novel incubator comprises the casing body 1 mounted on legs 2 and lined at 3 with an appropriate non-heat conducting or insulating material. Hingedly connected at 4 to the casing body 1 is a lid or cover 5, provided at its inner side with insulating material designated by 6. The casing body 1 is equipped at 7 with a door, hingedly connected at 8, this door being designed for the convenient introduction and removal of a vessel 9 designed to contain water of any suitable temperature and to hold the water below the germinating eggs with a view to keeping the shells of the eggs moist, so that at the time of hatching the chicks can break their way out of the egg shells.

Appropriately fixed in the casing body 1 at an intermediate point in the height thereof is a shelf 10, and located in one upright wall of said casing body, at a point below said shelf, is a screened ventilating opening 11 for the admission of atmospheric air to the interior of the lower part of the casing body. On the shelf 10 is a skirt 12 arranged adjacent to the upright walls of the casing body 1, and on the said skirt 12 are eyes 13. It will also be noticed that the skirt 12 carries at its lower edge an open work egg supporting diaphragm 14, preferably of reticulated material as illustrated. The eyes 13 are provided for the connection of a curtain 15 of appropriate flexible material, the said curtain having for its function to retain the major portion of the heat in the upper portion of the casing body 1, and being designed to be detached from some of the eyes 13 so as to hang, as shown by dotted lines in Figure 2 in order that at intervals atmospheric air can reach the eggs for the intermittent cooling of the eggs incident to the hatching process.

Located in the casing body 1 and above the shelf 10 is a hollow water holder 16 of open rectangular form as clearly shown in Figures 1, 2 and 3. The said holder 16 is provided with a filling opening 17, normally closed by a backed cap 18, and it is also provided with a drain cock 19. Manifestly by virtue of the provisions just stated the holder 16 may be filled with hot water, and after the said water has cooled the holder may as readily be discharged of water to afford space for a fresh supply of hot water. It will also be noted that Figure 3 shows the holder 16 as having threaded nipples 20 and 21. These nipples 20 and 21 are adapted to be connected with piping so as to incorporate the holder 16 in and make the same form a part of a hot water heating system, and when this embodiment is employed the filling opening 17 and the drain cock 19 will be used purely for clean out purposes. When, however, the holder 16 is not incorporated in the hot water heating system the nipples 20 and 21 will be capped as illustrated by dotted lines in Figure 3.

With a view to preventing the too free radiation of heat from the holder 16, I wrap the same in a covering 22 of suitable insulating or non-heat conducting material, a portion of this covering being, of course, removable in order to afford access to the filling opening 17 when occasion demands.

I also employ a sack 23 filled with feathers or other loose insulating material, designated by 24. The said sack is positioned within the wrapped holder 16 through a considerable portion of the height of the said holder 16 and is lapped over portions of the wrapped holder 16 as clearly shown in Figures 1 and 2. From this it follows that the insulating sack 23 will adequately serve to prevent the upward passage of heat from the holder 16 and will assure such heat being retained in proximity to the eggs on the egg support 14.

In the operation of my novel incubator, the eggs are placed on the support 14, and by the hot water means described a temperature of approximately 94° F. is maintained in the incubator. Experience has demonstrated that when the holder 16 is hand filled it is necessary to draw the old water from and supply fresh hot water to the holder 16 about every twelve hours, and experience has also demonstrated that it is desirable at appropriate intervals to lower the curtain 15 as shown by dotted lines in Figure 2 at certain intervals so as to permit cooling of the eggs, this corresponding to the periods when a hen leaves her nest in order to take dust baths. The sack 23 is readily removable when the cover j is opened, and consequently access may be readily gained to the eggs to turn the same, and for other purposes.

A wall 24′, Figures 1 and 2, is arranged under the shelf 10 and opposite the drain pipe as shown.

In Figures 4 and 5 the water holder 16ª is in the form of a coil or pipe, and its terminal portions 20ª and 21ª are designed for connection to house pipes so as to incorporate the holder 16ª in a hot water heating system. When the coil pipe 16ª is not so incorporated the terminals 20ª and 21ª are capped in the manner before described with reference to Figure 3. The water holder in the form of a coil pipe 16ª is provided with a drain cock 19 and is also provided with a normally closed filling portion 17ª for the charging and discharging of the holder 16ª by hand when that practice is followed.

In Figure 6, I illustrate a water holder 16ᵇ of open configuration made up of a number of separable units 30, Figure 7, designed to occupy the same space in the incubator as the holder 16. The said units 30 are in the form of jars of metal or glass, and each jar is separable from the others and is provided with a threaded or other appropriate cap 31. Manifestly when the hot water holder is made up of separable units each unit may be filled and discharged independently of the other units. This specific arrangement is advantageous inasmuch as the heat given off by some of the units 30 is utilized incident to the discharging and filling of other units.

Notwithstanding the practical advantages of my novel incubator as set in the foregoing, it will be readily appreciated that the incubator is simple and inexpensive in construction and embodies no delicate parts such as are likely to get out of order after a short period of use.

I have entered into a detailed description of the construction and relative arrangement of the parts embraced in the present and preferred embodiments of my invention in order to impart a full, clear and exact understanding of the said embodiments. I do not desire, however, to be understood as confining myself to the specific construction and relative arrangement of parts inasmuch as in the future practice of the invention various changes and modifications may be made such as fall within the scope of my invention as defined in my appended claims.

Having described my invention, what I claim and desire to secure by Letters-Patent, is:—

1. An incubator comprising a casing having an opening at a suitable point in its height for the passage of atmospheric air, a foraminous egg support located in the casing and disposed above the said opening, heating means in the casing and above said egg support, and a curtain carried by and below the egg support and detachably connected therewith whereby said curtain may be lowered when it is desirable to establish communication between said opening and the foraminous egg support for egg-cooling purposes.

2. An incubator comprising a casing having an opening at a suitable point in its height for the passage of atmospheric air, a foraminous egg support located in the casing and disposed above said opening, heating means in the casing and above said egg support, and a curtain carried by and below the egg support and detachably connected therewith whereby said curtain may be lowered when it is desirable to establish communication between said opening and the foraminous egg support for egg-cooling purposes; the said casing comprising a body and a movable cover, and the said heating means being in the form of a water holder of open configuration, and being associated with an insulating covering wrapped about the whole, and with a sack filled with loose insulating material and removably arranged partially within the wrapped water holder and partially above said holder and between the same and the cover.

In testimony whereof I affix my signature.

CORA D. CHAMBERS.